US012100095B2

(12) United States Patent
Varekamp

(10) Patent No.: US 12,100,095 B2
(45) Date of Patent: Sep. 24, 2024

(54) IMAGE PROCESSING METHOD FOR SETTING TRANSPARENCY VALUES AND COLOR VALUES OF PIXELS IN A VIRTUAL IMAGE

(71) Applicant: KONINKLIJKE PHILIPS N.V., Eindhoven (NL)

(72) Inventor: Christiaan Varekamp, Veldhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 334 days.

(21) Appl. No.: 17/767,064

(22) PCT Filed: Oct. 23, 2020

(86) PCT No.: PCT/EP2020/079899
§ 371 (c)(1),
(2) Date: Apr. 7, 2022

(87) PCT Pub. No.: WO2021/083802
PCT Pub. Date: May 6, 2021

(65) Prior Publication Data
US 2022/0375159 A1    Nov. 24, 2022

(30) Foreign Application Priority Data
Oct. 29, 2019   (EP) ..................... 19205944

(51) Int. Cl.
*G06T 15/20* (2011.01)
*G06T 19/20* (2011.01)

(52) U.S. Cl.
CPC ............ *G06T 15/205* (2013.01); *G06T 19/20* (2013.01); *G06T 2219/2012* (2013.01)

(58) Field of Classification Search
CPC ................... G06T 15/205; G06T 19/20; G06T 2219/2012
(Continued)

(56) References Cited

U.S. PATENT DOCUMENTS 5,774,191 A * 6/1998 Iverson ..................... H04N 9/75
348/592
6,825,852 B1 * 11/2004 Hamburg ............... G06T 11/001
345/592
(Continued)

FOREIGN PATENT DOCUMENTS

EP    1059611 A1 * 12/2000 ............. G06T 15/10
EP    2230855 A2 *  9/2010 ........... G06T 15/205
(Continued)

OTHER PUBLICATIONS

Lawrence Zitnick C et al: "High-quality video view interpolation using a layered representation", ACM Transactions On Graphics, ACM, 2 Penn Plaza, Suite 701New York NY10121-0701USA, vol. 23, No. 3, Aug. 1, 2004 (Aug. 1, 2004) pp. 600-608.
(Continued)

*Primary Examiner* — Mahendra R Patel

(57) ABSTRACT

A method is provided for selecting a transparency setting and color values of pixels in a virtual image. The virtual image can be formed by combining reference images taken at different angles to produce the virtual image that views an object at a new, uncaptured angle. The method includes determining for each pixel of the virtual image, what information it carries from the reference view images. The information of the pixel is used to define a pixel category, and the category is used to select, based on logical conditions, what information will be displayed by the pixel and to set the color of the pixels.

20 Claims, 5 Drawing Sheets

(58) Field of Classification Search
USPC .......................................................... 372/285
See application file for complete search history.

(56) References Cited

U.S. PATENT DOCUMENTS

| | | | |
|---|---|---|---|
| 7,522,186 B2 * | 4/2009 | Arpa | G06T 7/30 348/143 |
| 9,053,573 B2 * | 6/2015 | Lin | G06T 15/20 |
| 9,916,668 B2 * | 3/2018 | Nguyen | G06T 11/60 |
| 2009/0102857 A1 * | 4/2009 | Kallio | G06T 11/40 345/611 |
| 2014/0092281 A1 * | 4/2014 | Nisenzon | H04N 13/271 348/262 |
| 2018/0033209 A1 * | 2/2018 | Akeley | G06T 19/006 |
| 2019/0035365 A1 * | 1/2019 | Waschbuesch | G06T 5/92 |
| 2019/0045157 A1 * | 2/2019 | Venshtain | G06F 3/04815 |

FOREIGN PATENT DOCUMENTS

| | | | | |
|---|---|---|---|---|
| JP | 2004133888 A | * | 4/2004 | ........... G06T 15/205 |
| WO | WO-9728654 A2 | * | 8/1997 | ............. G09G 5/026 |
| WO | WO-0245001 A1 | * | 6/2002 | ........... G06T 15/205 |
| WO | WO-2013049699 A1 | * | 4/2013 | ............... G06K 9/36 |
| WO | WO-2017212686 A1 | * | 12/2017 | ......... G02B 27/0101 |

OTHER PUBLICATIONS

Karsten Muller et al: "View Synthesis for Advanced 3D Video Systems" ,Eurasip Journal on Image and Video Processing, vol. 2008, Jan. 1, 2008 (Jan. 1, 2008).

S. Muddala et al:"Edge-preserving depth-image-based rendering method", 2012 International Conference on 3D Imaging (IC3D), IEEE, Dec. 3, 2012 (Dec. 3, 2012), pp. 1-5.

Yung-Yu Chuang et al: "A Bayesian approach to digital matting", Proceedings of the 2001 IEEE Computer Society Conference on Computer Vision and Pattern Recognition. CVPR 2001, vol. 2, Jan. 1, 2001 (Jan. 1, 2001), pp. II-264-II-271.

International Search Report and Written from PCT/EP2020/079899 mailed Jan. 24, 2021.

* cited by examiner

IMAGE PROCESSING METHOD FOR SETTING TRANSPARENCY VALUES AND COLOR VALUES OF PIXELS IN A VIRTUAL IMAGE

CROSS-REFERENCE TO PRIOR APPLICATIONS

This application is the U.S. National Phase application under 35 U.S.C. § 371 of International Application No. PCT/EP2020/079899, filed on Oct. 23, 2020, which claims the benefit of EP Patent Application No. EP 9205944.2, filed on Oct. 29, 2019. These applications are hereby incorporated by reference herein.

FIELD OF THE INVENTION

This invention relates to the field of image processing, and more specifically to the field of creating virtual images from combinations of reference view images. It relates in particular to a method for setting transparency values and color values of pixels in a virtual image.

BACKGROUND OF THE INVENTION

Virtual images of objects can be created by combining reference view images of the object that have been captured from multiple different viewpoints. The virtual images that can be generated from the combination of reference view images can be created such that they view the object from any angle, including that angles the reference view images were not captured from.

Reference view images are often captured against a chroma key background, so that the resultant virtual image of the target can be used on different graphics backgrounds, for example in Virtual Reality or Augmented Reality (VR/AR). The virtual image, formed from combinations of the reference view images, can comprise overlapping areas of any combination of areas of background and/or areas of the object from each of the reference view images.

Existing image processing techniques address layered images by calculating the color of a surface pixel by a linear combination of the color and transparency values of the layers in the image. US 2009/102857 is one example of this technique, calculating the color of a surface pixel according to the transparency value of the surface pixel, the transparency of a subjacent pixel and the color of the subjacent pixel.

Linear combination techniques, such as in US 2009/102857, introduce areas of false transparency when used on virtual images. These areas of false transparency occur close to the edges of the object from each reference view image, meaning that the virtual image, formed from overlapping combinations of the reference view images, can contain many areas of false transparency.

The areas of false transparency are commonly referred to as regions of ghosting, or ghost regions. These ghost regions cause the graphics backgrounds that the object may be used with to shine through the object, reducing the quality of the virtual image and in turn the VR/AR that the virtual image may be used in. The user of the VR/AR may lose emersion in the scenario they are in and may be unable to perform the tasks required of them due to the ghost regions hindering their ability to see objects or read.

There is, therefore, a need for a method of image processing which can set transparency and color values for pixels in a virtual image without introducing ghost regions.

SUMMARY OF THE INVENTION

The invention is defined by the claims.

According to examples in accordance with an aspect of the invention, there is provided a method for setting, in a virtual image, a respective color value and a transparency value for a plurality of virtual image pixels, the method comprising:
  receiving a plurality of reference view images of an opaque object, wherein each of the plurality of reference view images is captured from a different viewpoint; and
  combining the plurality of reference view images to create a virtual image of the object, wherein the virtual image is at a different viewpoint from any of the plurality of reference view images, and wherein each reference view image pixel corresponds to a virtual image pixel by a mapping, wherein creating the virtual image comprises:
  determining transparency information, comprising at least components of foreground information and background information, for each of the plurality of virtual image pixels, which components derive from the corresponding pixels from each of the plurality of reference view images;
  classifying each of the plurality of virtual image pixels based on a combination of the components of foreground information and background information;
  for regions away from an edge of the object, selecting a binary transparency value for each of the plurality of virtual image pixels, based on their classification, to display foreground or background information; and
  setting the color value of each of the plurality of virtual image pixels, based on the foreground or background information selected to be displayed.

Each of the plurality of reference view images may comprise depth information. The mapping between the reference view image pixels and virtual image pixels may be based on the depth information.

The method classifies each pixel in a virtual image formed from multiple reference images taken from different angles or perspectives. A virtual image is made by combining reference images, meaning that each pixel of the virtual image is constructed using information components from multiple reference images. Each pixel of the reference view images is mapped to at least one virtual image pixel. The transparency information components (for example, foreground information from reference view image 1 and background information from reference view image 2) mapped to each of the plurality of virtual image pixels can be determined, creating a classification for each pixel based on its combination of foreground/background information components. The virtual image pixel classification is used to determine which component should be displayed, and subsequently that color of the virtual image pixels should be set to specific respective values. By choosing one of the components of transparency information to be displayed, the invention ensures that the virtual image of the object does not contain background artifacts overlaying the object, or, if the object is captured over a chroma key (such as a green screen), does not lead to ghosting when projected over a background.

The transparency value indicates whether the pixel is in the foreground or the background.

Each pixel of the constructed virtual image for example comprises RGBA values, wherein the alpha channel (A) contains the needed background/foreground information. The reference images may also be encoded in the same format with RGBA pixels. They are warped to create the virtual image. The reference images typically also have an associated depth or disparity map (D) that contains 3D information such that a camera shift results in a warped image that is steered by the local 3D information. A reference image can thus contain five channels: RGBAD.

Each of the reference view pixels for example comprises transparency information in the form of foreground information, background information or uncertain information, and wherein determining transparency information further comprises determining uncertain components for each of the plurality of virtual image pixels.

Thus, pixels in the reference images may be coded as foreground, background or uncertain. The combinations of these three states from multiple reference images determine the classification for each pixel and in turn the transparency information.

Edge regions of the object can contain a combination of background components and foreground components, which can contribute to ghosting effects. This uncertain component allows ghosting regions to be identified.

The classification of the virtual image pixels (referred to as the pixels herein), may further include a classification of ghosting regions for the pixels comprising combinations of components of uncertain regions and foreground information.

This classification enables the ghosting regions to be located and targeted for correction.

The method may comprise, for each of the virtual image pixels with transparency information comprising components only of foreground information, selecting a transparency value corresponding to the foreground.

Selecting only foreground information for display may contribute to removing the ghosting effect, as it helps to remove the presence of background coloration on the object's surface introduced by ghosting regions. It can further ensure that the background information components of the image do not overlay the foreground information components in pixels that comprise both foreground and background components.

A new outer boundary of the object may be created in the virtual image by selecting a transparency value corresponding to the foreground for all virtual image pixels with transparency information comprising only combinations of components of background information and uncertain components, or only combinations of a plurality of uncertain components.

This new outer boundary can connect overlapping boundaries from the reference view images into a single continuous outer edge.

This choice of pixel classifications selects pixels that are at or close to the outer boundary of the overlapping reference view images of the object, and reduces any reduction in object size that may occur in defining a new outer boundary.

The setting of color values in the method may set the respective color values of each of the pixels with transparency information comprising only components of foreground information as the averaged color value of the respective foreground information components from the reference view image pixels that corresponds to each pixel. A weighted combination may be used where the weight is higher when the target virtual view-point lies closer to a particular reference view.

This enables the object in the virtual image to have a smooth transition of color across its surface, as the reference view images may show the object in different colors due to lighting, reflections and/or the object having different colors on different faces.

The method may comprise selecting a binary transparency value for all of the virtual image. Thus, the pixels of the entire virtual image may be classified as foreground or background.

One limit value of the transparency is for background and the other limit value is for foreground. For regions at the edge of the object, a transparency value may be set between the limit values.

In this way, the color transition to the background at the edge of the object may be made less sharp.

The method for example comprises, for each of the plurality of virtual image pixels with transparency information comprising uncertain components and not comprising foreground components, setting the transparency value of each of the pixels using the color difference between the pixel and at least one neighboring pixel.

The virtual image pixels comprising uncertain components and not comprising foreground components are those that define the edge of the object. They are set to an intermediate transparency value rather than the binary foreground/background setting. The transparence is set based on the color of neighboring virtual image pixels which do comprise foreground information.

This enables the blending of the edges of the object with the new background, allowing for a smooth transition that does not appear sharp and unrealistic. The transparency may be calculated using the color difference of a neighboring pixel, the color difference with a known (e.g. green) background color, may be calculated using a Euclidean distance weighted combination to neighbor pixels, or may be calculated using other averaging methods known in the art, and any combination thereof.

The transparency information components of each of the plurality of virtual image pixels may be derived from the color of the reference view image pixels that correspond to each of the plurality of virtual image pixels. Each reference view image pixel that is combined to form a virtual image pixel contributes some color to the virtual image pixel. This color can be used to determine if the pixel is displaying part of the image background, or part of the target object.

The background of the reference view images may be a chroma key background.

This simplifies identifying background and foreground components by color selection, as the background is a known and consistent color.

The method may be a computer program comprising computer program code means which is adapted, when said program is run on a computer, to implement the method of any example of the invention.

There is also provided an image processing device, comprising:
an input for receiving a plurality of reference view images of an object, wherein each of the plurality of reference view images comprises foreground information and background information captured from a different viewpoint;
a processor for processing the plurality of reference view images to generate a virtual image; and
an output for outputting the virtual image,
wherein the processor is adapted to implement the method defined above.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
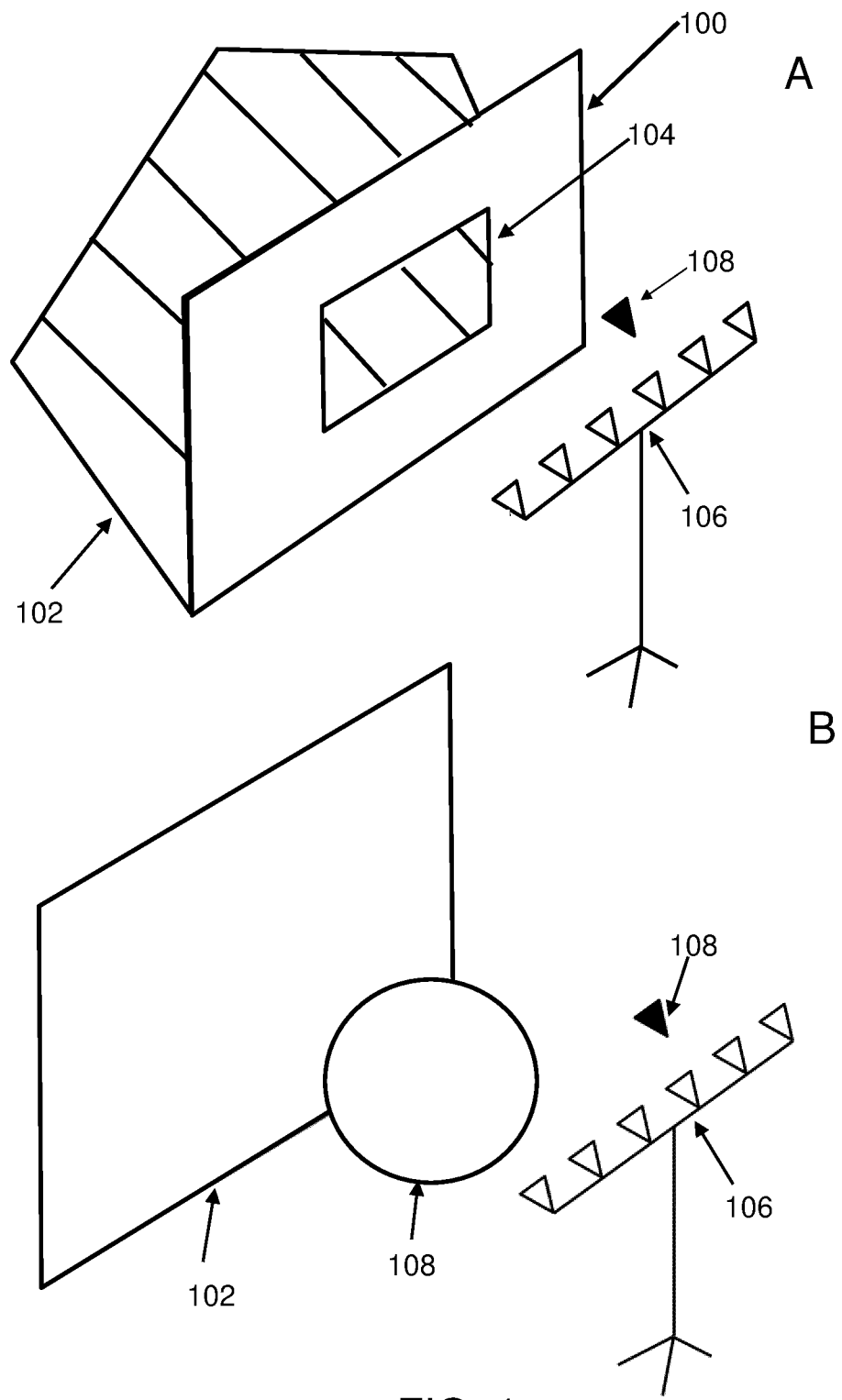
FIG. 1A shows an example setup for capturing reference view images of a semi-transparent window through which a background can be seen.
FIG. 1B shows an example setup for capturing reference view images of an object in front of a chroma key background.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a method for setting a transparency value and color values of pixels in a virtual image. The virtual image can be formed by combining reference images taken at different angles to produce the virtual image that views an object at a new, uncaptured angle. The method includes determining for each pixel of the virtual image, what information it carries from the reference view images. The information for the pixel is used to define a pixel category, and the category is used to select, based on logical conditions, what information will be displayed by the pixel and to set the color and transparency values of the pixels. The invention is directed in particular to the blending of the virtual image of the object with a new background, that is assumed to always be further away than the object.

Before describing the invention in detail, the issues relating to image transparency and depth, and the conventional approach for creating a new image from a different viewpoint (termed a "virtual image"), will first be described.

FIG. 1A shows an example of the occurrence of transparency in multi-camera captures. The scene being captured comprises an object having a foreground 100 and a background 102 with a semi-transparent window 104, through which the background 102 is visible. The overall scene is captured by a set of cameras 106, each of which generates a reference image. The images are to be processed in order to generate a new image from a virtual camera 108 at a different viewpoint to each of the cameras of the set of cameras 106. This new image is termed a virtual image. By this is meant it is an image as would be captured from a virtual camera location, i.e. a location where a real camera image is not available.

For the semi-transparent window 104, each camera 106 will see a different blend of the foreground 100 and background 102. The standard approach to synthesize a new virtual image from the viewpoint of the virtual camera 108 is to weight warped versions of two or more reference views based on pose proximity, de-occlusion (stretching) and possibly depth. When the pose of the view to synthesize is close to the pose of a reference view this naïve approach may give sufficient image quality.

FIG. 1B shows an example of the relevance of transparency when using chroma-keying. In this case, the background is set to be a screen of known color, such as green. This enables easy extraction of the foreground from the background in image processing.

This is a special case of transparency, in that the object to be capture is non-transparent, and is considered fully transparent (to show the background screen) outside its outer boundary. The object does not need to be a closed solid shape of course, and it may have openings through which the screen is visible.

The problem here is more acute since the green-screen background 102 needs to be replaced by a new background to create the virtual image. For example, the foreground is superimposed over a separate background, to create the desired overall image. If transparency is ignored, mixed pixels that still contain a green color component will remain at the object boundary. This is very visible when using a naïve view-blending method that ignores transparency, or when using linear combination methods.

A standard approach to chroma-keying is to calculate a transparency map. Using the standard alpha-matting equation, the image color of a pixel can be described as a linear combination of a foreground and background color:

$$i = \alpha f + (1-\alpha) b$$

In this equation, i denotes the determined pixel color, f denotes the foreground color, b denotes the background color and $\alpha$ is a transparency value. This equation is applied on a per-pixel basis to the entire image, creating the transparency map.

Given the color characteristics of the specific background that is used for chroma-keying (e.g. green) the foreground color f and transparency value $\alpha$ for a pixel can be estimated using one of many algorithms that exist in literature. The color data may be used to determine the transparency of each reference image pixel by comparing it with the known background color. If the pixel color=chroma key color then the pixel is transparent. If the pixel contains only a fractional amount of the chroma key color then it is semi-transparent. If it contains no amount of the chroma key color then it is not transparent.

Different algorithms exist for this purpose. They typically use known color characteristics of the background material in combination with processing in a local neighborhood around a pixel. Even without a green screen, transparency can still be estimated around detected depth steps in a depth map. In such situations, mixed pixels typically exist around a defocused foreground edge.

The value of $\alpha$ varies between 0 and 1. In this document, a notation is selected by which 1 denotes zero transparency so the foreground color is visible and 0 denotes full transparency so the background color is visible.

Thus, an area of transparency ($\alpha=0$) of an image is one where the background is visible whereas an area of no transparency ($\alpha=1$) of an image is one where the foreground is visible.

Typically, a small neighborhood of pixels is used to estimate these variables. When applied to k=1 ... N reference view images and taking into account the presence of perspective information that resulted from a depth sensor or a depth estimation process, the following data is obtained:

$$f_1, d_1, \alpha_1, b_1$$
$$\ldots$$
$$f_N, d_N, \alpha_N, b_N$$

This data is for a pixel in each of the reference images 1 ... N, that corresponds to a pixel in the virtual image. The virtual image as a whole uses many sets of this data to determine values for all of its pixels.

For all original pixels of the green-screen, $\alpha=0$ as only the chroma key color is seen. For pixels on the foreground object, $\alpha=1$ as none of the chroma key color is seen. For pixels on the boundary or in transparent regions, $0 \leq \alpha \leq 1$ as a fraction of the pixel color is the chroma key color.

The transparency map, i.e. the set of values of $\alpha$ for the overall image, can be used to blend a single reference view with a new background. However, the known rendering approach using the multiple reference views cannot deal with transparency.

Currently, multiple reference views are each warped to the view-point that is synthesized after which the multiple predictions are blended to predict a single new synthesized view (the virtual image). The following equation calculates the color of a single virtual image pixel based on the reference view image pixels from each reference view image that map to that specific virtual image pixel:

$$\tilde{i} = \frac{w_1 \tilde{i}_1 + \ldots + w_N \tilde{i}_N}{w_1 + \ldots + w_N}$$

where the tilde $\sim$ on i denotes that the reference view images were warped before being combined to form a weighted prediction. In the equation, the w values are the weighting factor given to each reference view image or each pixel in a reference view image. The "$\tilde{i}$" values with subscripts refer to the color value of a pixel in a specific reference view image, the reference view image given as the number of the subscript. The "$\tilde{i}$" without a subscript is the calculated color value of the virtual image pixel that all the reference view image pixels correspond to.

The reference view images are warped prior to combination in order to determine which reference view image pixels correspond to the virtual image pixels, as the mapping between the two will vary between reference images and the desired viewpoint of the reference image. The equation must be applied for each virtual image pixel to determine its color based on its corresponding reference image pixels. The above equation just ignores the presence of $\alpha$.

A straightforward approach would be to also warp and weigh a in a manner similar to how color is averaged. Again the process calculates a value for a single pixel, based on the properties of the reference image pixels that map to that specific virtual image pixel, and must be carried out for each virtual image pixel. Again, the w values are the weighting factor given to each reference view image or each pixel in a reference view image. The $\alpha$ values with subscripts refer to the transparency value of a pixel in a specific reference view image, with the reference view image identified by the subscript number. The $\alpha$ without a subscript is the calculated transparency value for the virtual image pixel that each of the reference image pixels correspond to:

$$\tilde{\alpha} = \frac{w_1 \tilde{\alpha}_1 + \ldots + w_N \tilde{\alpha}_N}{w_1 + \ldots + w_N}$$

The resulting virtual image pixel color $\tilde{i}$ and transparency $\tilde{\alpha}$ can now be used to composite the captured multi-view foreground object onto a new (graphics) background.

However, this approach for dealing with transparency results in artefacts around the boundary of the foreground object.

Figure 2:
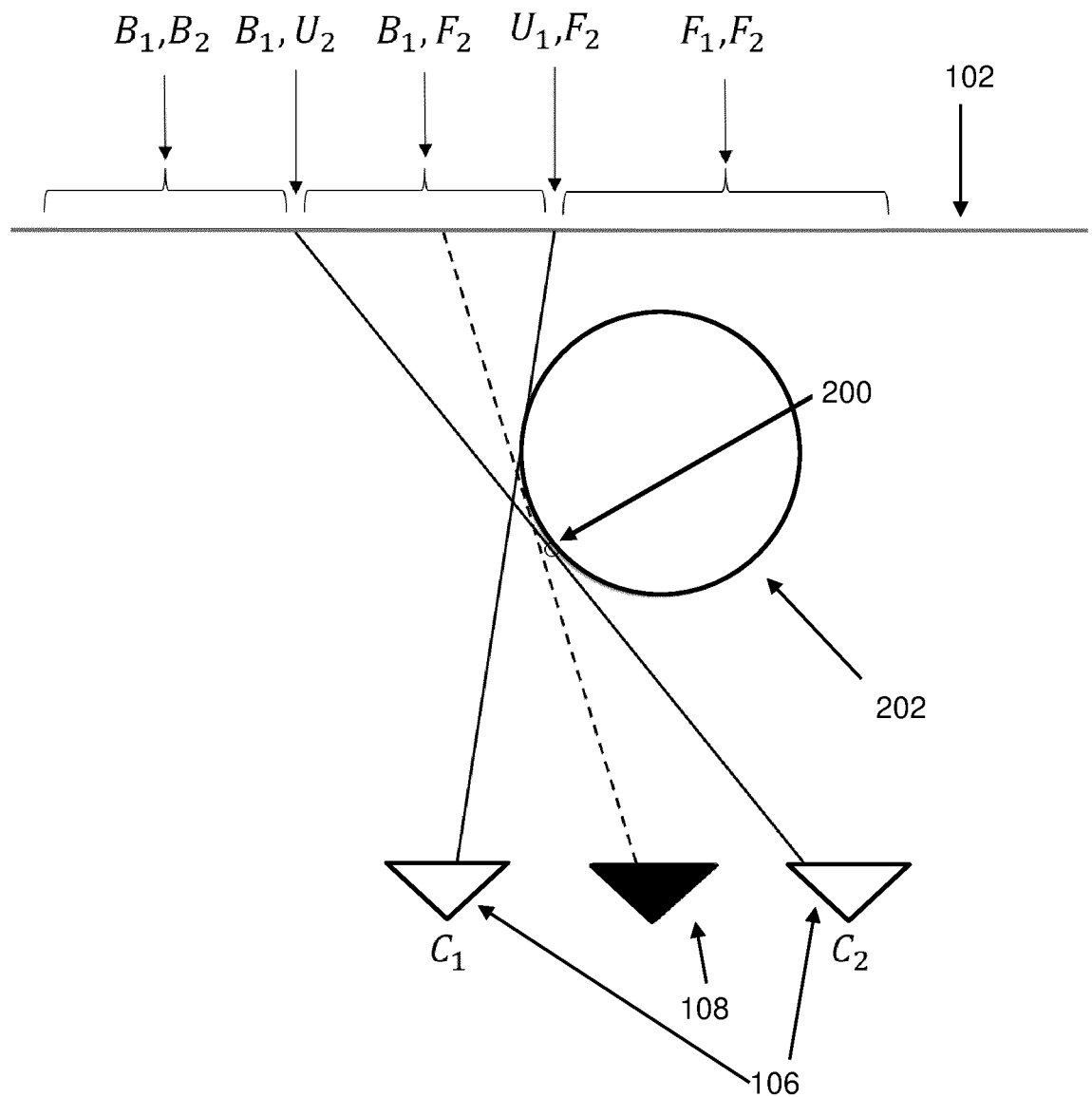
FIG. 2 shows an example of a top down view of two reference cameras capturing reference view images of an object against a chroma key background.

FIG. 2 shows two reference cameras 106, $C_1$ and $C_2$ for capturing an foreground object 202 in front of a green screen 102.

A naïve weighted combination of the transparency values of reference views results in a ghost region 200 where the background 'shines' through the foreground object. These semi-transparent ghost regions 200 occur close to the boundary of the foreground object 202, produced by this method.

FIG. 2 shows different regions along the green screen 102. The two reference cameras 106 will view different parts of the scene when directed towards those regions. The first region is denoted $B_1$, $B_2$. This means the first camera $C_1$ observes background information $B_1$ when imaging in that direction and the second camera $C_2$ observes background information $B_2$ when imaging in that direction. The last region is denoted $F_1$, $F_2$. This means the first camera $C_1$ observes foreground information $F_1$ when imaging in that direction and the second camera $C_2$ observes foreground information $F_2$ when imaging in that direction. There is conflict between the reference images in the other regions. U denotes an undefined region which is close to the boundary.

The 3D shape of the object can cause the ghosting problem to occur. However, depth estimation and/or filtering errors can also cause this problem.

Figure 3:
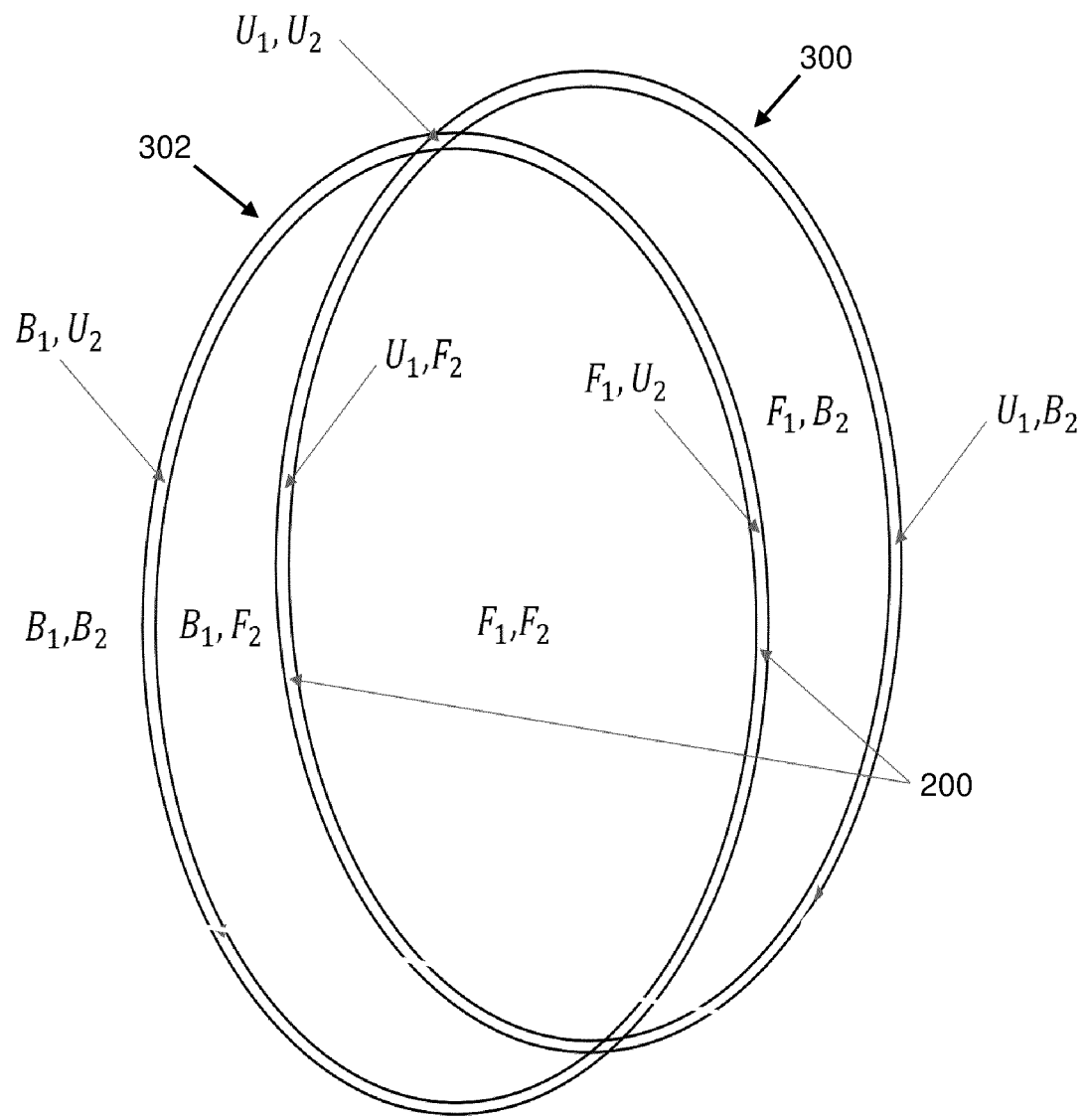
FIG. 3 shows an example of a virtual image formed from two reference view images with classifications for use in the method of the invention.

FIG. 3 shows two ellipse shaped images 300, 302 of a foreground object which have been warped from two differently positioned reference cameras that were used to image a scene.

As in FIG. 2, the two letter combinations indicate whether for each warped reference view the pixel is a foreground pixel (F), a background pixel (B) or an uncertain pixel (U) that features coloration from both the foreground and background. The subscripts indicate which reference view image and hence which camera the pixel originated from.

The reference view image of the object 202 captured by camera $C_1$ is the ellipse 300. This has been combined with the reference view image of the object 202 captured by camera $C_2$, the ellipse 302. The regions in the virtual image where the edge of one of the reference view image ellipses overlaps with the interior of the other reference view ellipse produces ghost regions 200.

The approach of the invention will now be described.

Figure 4:
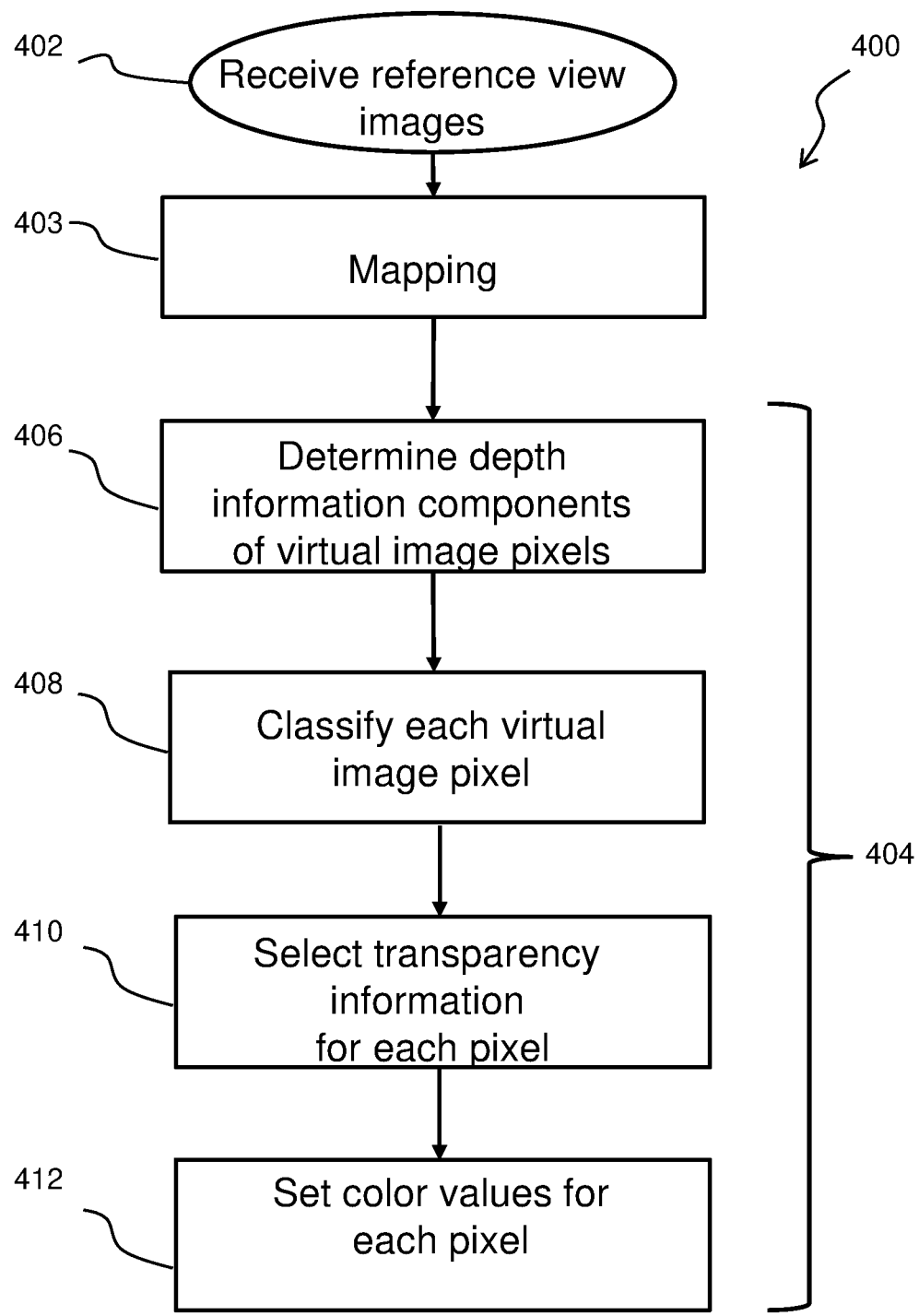
FIG. 4 shows a flow chart with the steps of an example of the invention.

FIG. 4 shows a method 400 for setting, in a virtual image, a respective color value and a transparency value for a plurality of virtual image pixels.

In step 402, a plurality of reference view images of an object are received. Each of the plurality of reference view images comprises foreground information and background information captured from a different viewpoint.

The reference view images are then mapped in step 403 so that there is a mapping between pixels of each reference image to the single virtual image. This mapping depends on the viewpoint of each reference image and for example involves warping and combining the images. There is then a correspondence between pixels of the reference images and pixels of the virtual image. In particular, the content of each pixel of the virtual image is determined from the content of "corresponding" (i.e. linked by the mapping) pixels from the reference images. Typically, this is a many-to-one mapping, but this is not essential. For example, due to occlusion, more than one input pixel will map onto one and the same output.

A set 404 of steps is then carried out to combine the plurality of reference view images to create a virtual image of the object. The virtual image is at a different viewpoint from any of the plurality of reference view images.

In step 406 transparency information is determined, comprising at least components of foreground information and background information for each of the plurality of virtual image pixels. These components derive from the corresponding pixels of the plurality of reference view images.

For example, one region of the image of FIG. 3 is denoted $B_1, F_2$. $B_1$ is a component of background information which has been obtained from the reference image camera $C_1$ and $F_2$ is a component of foreground information which has been obtained from reference image camera $C_2$.

For one pixel in that area, the set $B_1, F_2$ constitutes the "components of foreground information and background information".

In step 408, each of the plurality of virtual image pixels is classified based on a combination of the components of foreground information and background information.

The classification is used to determine which component should be displayed. In particular, for each pixel in the virtual image, components of foreground/background information are determined that derive from corresponding pixels (i.e. based on the mapping used to derive the virtual image from the reference images) in the plurality of reference view images. The pixels are classified according to their components of foreground/background information. A transparency value may then be derived. The transparency value may have only binary components, corresponding to "foreground" or "background" in a most simple implementation. As is clear from the description above, the transparency data may be derived from color data. The transparency value determines whether foreground or background scene data has been recorded. The green-screen color is basically measured and the transparency value depends on how close the observed color is to the green screen color. More sophisticated methods exist.

The invention makes use of a non-linear dependency of the components of foreground/background/uncertain information (F, B and U) on the transparency. This is for example a classification of each pixel of the references images by one of three different components:

$$C = \begin{cases} F & \text{if } \alpha > 1 - \Delta \\ B & \text{if } \alpha < \Delta \\ U & \text{otherwise} \end{cases}$$

where F means definitely foreground, B means definitely background and U denotes an 'uncertain' pixel. $\Delta$ is a threshold transparency value against which the pixel transparencies, $\alpha$, are compared. The threshold transparency may be set according to the object being imaged, and may be 0.5 or less.

Alternatively, the pixels may be classified according to unrelated ranges, for example:

$$C = \begin{cases} F & \text{if } \alpha > 0.6 \\ B & \text{if } \alpha < 0.2 \\ U & \text{otherwise} \end{cases}$$

For the example of chroma-keying, these uncertain pixels are the pixels that have mixed color values with the color of the background still visible in the output color. In some examples, more classifications may be used, particularly for objects with varying levels of transparency. In an image with multiple foreground objects, or for objects that have varying transparencies, there may be multiple foreground classifications corresponding to each object or the regions of each object.

The invention may also be implemented with only F and B components, as the threshold for a can be adjusted to ensure all possible values are encompassed by only F and B.

In step 410, either foreground information or background information is selected to be displayed by each of the plurality of virtual image pixels, based on their classification. This involves selecting a transparency value from one of the two binary values. The virtual image pixels are thus selected to display only foreground or background information in a binary manner, to avoid ghosting issues. This is discussed further below.

In step 412, the color value of each of the plurality of virtual image pixels is set based on the information selected to be displayed.

Referring back to FIG. 3, the ghost regions are from the following set of component combinations:

$$C_1, C_2 = \{(F_1, U_2), (U_1, F_2)\}.$$

This set of values represents a classification of the nature of that part of the virtual image. This classification for a particular pixel is used to select which component will be displayed by the pixel by encoding a suitable transparency value, and used to set the respective color.

An example of an algorithm which selects components for display based on transparency information of the reference view images and sets the color is given below:
if ($C_1$==F)
  if ($C_2$==F)
    Create weighting of reference colors and set output transparency to 1 (i.e. transparency setting=foreground)
  else Select F with transparency 1 (i.e. transparency setting=foreground)
else
  if ($C_2$==F)
    Select F with transparency 1 (i.e. transparency setting=foreground)
  else
    Select arbitrary color with transparency 0 (i.e. transparency setting=background)

This example algorithm always returns transparency equal to 0 in the case of:

$$C_1, C_2 = U_1, U_2.$$

There is in this case no need for exact transparency estimation as long as the classification is done correctly. The above algorithm only returns transparency values to be either 0 or 1 (and hence a pixel to be classified as background or foreground), so no intermediate values are generated.

Figure 5:
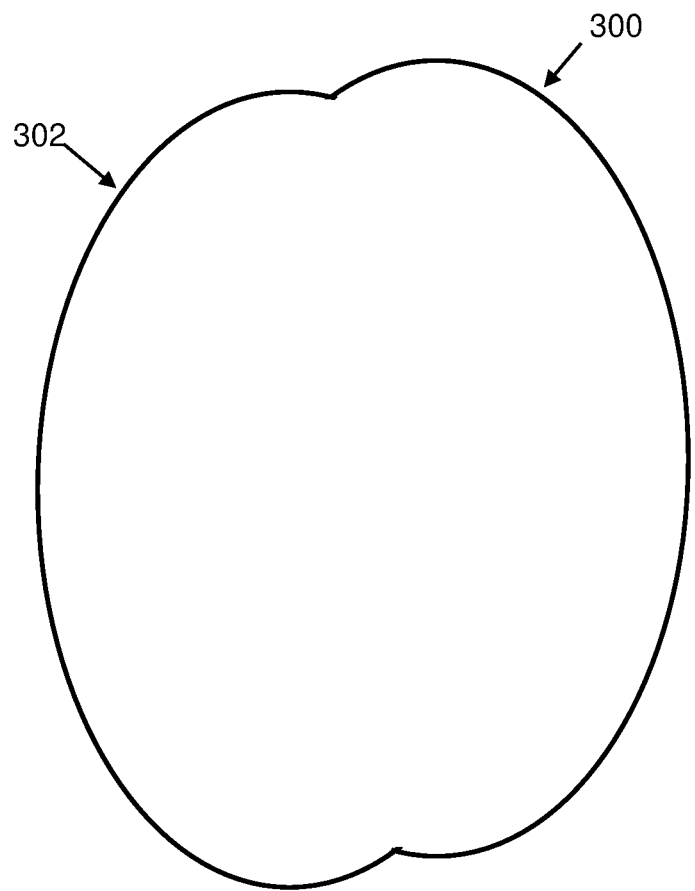
FIG. 5 shows the virtual image of FIG. 3 after having color and transparency values set according to an example of the invention.

FIG. 5 shows an example of a virtual image created by applying the above algorithm to the virtual image of FIG. 3. The combined projected foregrounds of all reference views results in a new outer boundary which is a combination of the ellipse shaped images 300,302. This new outer boundary is identifiable by the following class combinations:

$$C_1, C_2 = \{(B_1, U_2), (U_1, B_2), (U_1, U_2)\}.$$

These are virtual pixels with transparency information comprising uncertain components and not comprising foreground components.

The example algorithm above for example selects any desired color and makes the new outer boundary pixels fully transparent for blending with the new background. However, the effect of this is that the foreground object is reduced slightly in size because pixels with components of only uncertain information, which occur at points around the outer edge of the object, will be made transparent.

Another problem is that the object may appear to have a sharp color transition to the background. Where the foreground colors $f_1 \cdots f_N$ of each virtual image pixel $1 \cdots N$ and corresponding transparency values $\alpha_1 \cdots \alpha_N$ are accurately known, they can be used directly to blend the edges with the new background. However, in practice, it is very hard to estimate these parameters accurately.

An example of the invention may thus use intermediate transparency values for this boundary area. Thus, for regions at the edge of the object, a transparency value may be set between the limit values. The transparency value of each of the pixels in this edge region may be set using the color of at least one neighboring pixel.

In this way, a method for blending the new outer boundary of the object can be implemented. The method forms an estimate, for each pixel of the virtual image, of the foreground color $\hat{f}_1 \cdots \hat{f}_N$ using pure foreground pixels from a spatial neighborhood next to, around or near the pixel in question. These foreground pixels are per definition from the pixel sets that contain foreground in either one of the warped reference views:

$$C_1, C_2 = \{(F_1, B_2), (B_1, F_2), (F_1, F_2)\}.$$

In case, for a pixel or pixels being used in the averaging, both foregrounds are available, the method may select one color from one of the reference view images, or use the average color value of the two. The resulting transparency can be calculated from a color difference between the current (uncertain) pixel and the neighbor pixel and/or as a Euclidian distance weighted combination to the neighbor pixels, and/or using other averaging or weighting methods known in the art.

The further towards the boundary of the object the more transparent the output pixel should be, as an increasing fraction of the pixel color will be the chroma key color as the edge of the object is approached. This blends the new outer boundary of the object smoothly with the background.

The invention generalizes to using more than the two reference views used in the examples. Again the combinations of pixel classes derived from the multiple reference views may be used to determines the output color (selection or blending of multiple colors) and the setting of output transparency.

The approach described above, with a binary selection of the transparency based on a pixel classification, is a non-linear way to process the reference image pixels. It has been described above in connection with an opaque object (although optionally with fully transparent areas).

If objects have semi-transparent areas, the approach described above may be modified. For example the least transparent reference image may be dominant and its value of transparency is used as the output transparency value for the virtual image pixel. This for example enables an image of a cloudy, foggy or dirty window to be processed, or an image of hair. Instead of selecting the minimum transparency, a non-linear selection may be made.

A GPU implementation of the process to combine reference images is presented below.

```
#version 420
layout (binding = 0) uniform sampler2D firstImage;
layout (binding = 1) uniform sampler2D secondImage;
uniform float secondWeight;
in vec2 uvCoordinate;
out vec4 outputColor;
const float opaque = 0.9f;
void main( )
{
    vec4 t1 = texture (firstImage, uvCoordinate);
    vec4 t2 = texture (secondImage, uvCoordinate);
    vec4 t3 = vec4 (1.0f, 0.0f, 0.0f, 0.0f);
    if (t1.a >= opaque && t2.a >= opaque) {
        t3 = mix (t1, t2, secondWeight);
        t3.a = 1.0f;
    }
    else if (t1.a > t2.a) {
        t3 = t1;
    }
    else {
        t3 = t2;
    }
    outputColor = t3;
}
```

This code receives two-vector components from the reference view images (the x,y position of a pixel) and outputs a four-vector (three color components and a transparency component). For two reference view image pixels t1 and t2, their opacity "a" is compared against an opacity standard "opaque=0.9f". If both reference image pixels are found to meet or exceed this opacity threshold then the color of the virtual image pixel t3 is set as a mix of t1 and t2, and the opacity of the virtual image pixel is set to 1.0.

If both reference image pixels are not opaque according to the opacity standard, then their opacities are compared. The virtual image pixel t3 is set to match the color and opacity of the most opaque reference image pixel. In this case, the virtual image pixel can have an opacity that is neither 0 nor 1, but an intermediate value.

Figure 6:
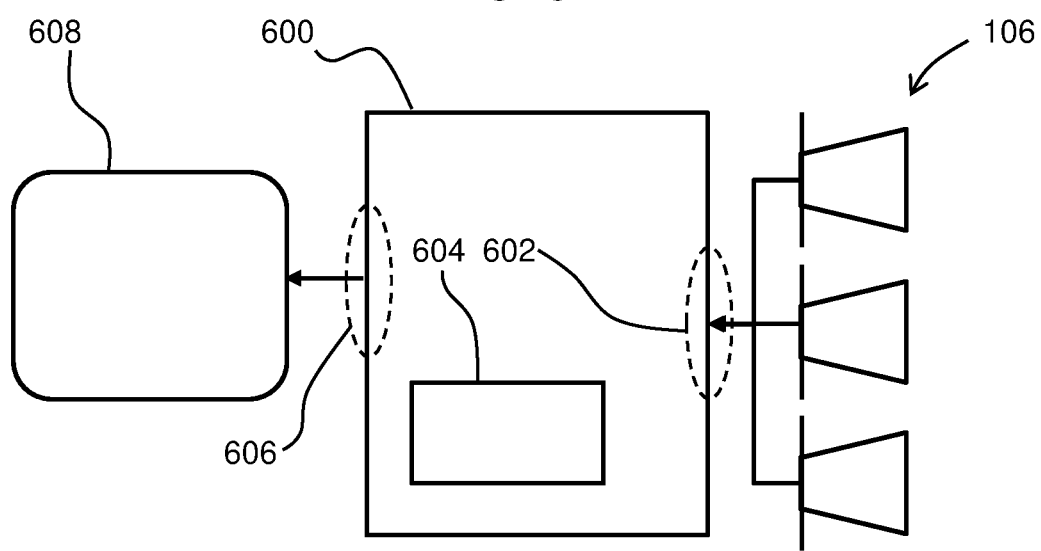
FIG. 6 shows an image processing device.

FIG. 6 shows an image processing device 600. An input 602 receives a plurality of reference view images of an object, as captured by the set 106 of cameras.

A processor 604 processes the plurality of reference view images to generate a virtual image. This is provided at an output 606 for example to a display 608. The processor implements the method described above.

In alternative examples, the algorithm may include an intermediate or multiple intermediate transparency values that the pixels can be set to. Furthermore, algorithms may set the transparency of pixels with the case of $C_1, C_2 = U_1, U_2$ to a value other than 1, for example when creating virtual images of objects which have varying degrees of transparency from each viewpoint or for objects that need to be made artificially transparent.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. If a computer program is discussed above, it may be stored/distributed on a suitable medium, such as an optical storage medium or a solid-state medium supplied together with or as part of other hardware, but may also be distributed in other forms, such as via the Internet or other wired or wireless telecommunication systems. If the term "adapted to" is used in the claims or description, it is noted the term "adapted to" is intended to be equivalent to the term "configured to". Any reference signs in the claims should not be construed as limiting the scope.

Generally, examples of an image processing device, methods of image processing, and a computer program which implements the method are indicated by the below embodiments.

EMBODIMENTS

1. A method (400) for setting, in a virtual image, a respective color value and a transparency value for a plurality of virtual image pixels, the method comprising:
   (402) receiving a plurality of reference view images of an opaque object, wherein each of the plurality of reference view images comprises depth information captured from a different viewpoint; and
   (404) combining the plurality of reference view images to create a virtual image of the object, wherein the virtual image is at a different viewpoint from any of the plurality of reference view images, and wherein each reference view image pixel corresponds to a virtual image pixel by a mapping, wherein creating the virtual image comprises:
   (406) determining transparency information comprising at least components of foreground information and background information for each of the plurality of virtual image pixels, which components derive from the corresponding pixels of the plurality of reference view images;
   (408) classifying each of the plurality of virtual image pixels based on a combination of the components of foreground information and background information;
   (410) for regions away from an edge of the opaque object, selecting a binary transparency value for each of the virtual image pixels, based on their classification; and
   (412) setting the color value of each of the plurality of virtual image pixels, based on the information selected to be displayed.

2. The method of embodiment 1, wherein each of the reference view pixels comprises depth information in the form of foreground information, background information or uncertain information, and wherein determining transparency information further comprises determining uncertain components for each of the plurality of virtual image pixels.

3. The method of embodiment 2, comprising, for each of the plurality of virtual image pixels with transparency information as combinations of uncertain components and components of foreground information, classifying the virtual image pixels as ghosting regions responsible for a ghosting effect.

4. The method of embodiment 2 or 3, comprising:
   for each of the plurality of virtual image pixels with transparency information comprising components only of foreground information, selecting a first binary transparency value corresponding to non-transparent; and
   for each of the plurality of virtual image pixels with transparency information comprising components only of background information, selecting a second binary transparency value corresponding to transparent.

5. The method of any one of embodiment 2 to 4, comprising creating a new outer boundary of the object in the virtual image by selecting a first binary transparency value corresponding to non-transparent for virtual image pixels with transparency information comprising only combinations of components of background information and uncertain components, or only combinations of a plurality of uncertain components.

6. The method of any one of embodiments 1 to 5, comprising, for each of the plurality of virtual image pixels with transparency information comprising only components of foreground information, setting the color of the pixel as the average color the reference view image foreground components.

7. The method of any one of embodiments to 6, comprising selecting a binary transparency value for all pixels of the virtual image.

8. The method of any one of embodiments 1 to 6, comprising, for regions at the edge of the object, setting a transparency value between the binary values.

9. The method of embodiment 8, comprising, for each of the plurality of virtual image pixels with transparency information comprising uncertain components and not comprising foreground components, setting the transparency value of each of the pixels using the color of at least one neighboring pixel.

10. The method of any one of embodiments 1 to 9, comprising, for each of the plurality of virtual image pixels, determining transparency information derived from the reference view images using the color of the corresponding reference view image pixels.

11. The method of any preceding embodiment, wherein the background is a chroma key.

12. A computer program comprising computer program code means which is adapted, when said program is run on a computer, to implement the method of any one of embodiments 1 to 11.

13. An image processing device (600), comprising:
   an input (602) for receiving a plurality of reference view images of an object, wherein each of the plurality of reference view images comprises foreground information and background information captured from a different viewpoint;
   a processor (604) for processing the plurality of reference view images to generate a virtual image; and
   an output (606) for outputting the virtual image,
   wherein the processor is adapted to implement the method of any one of embodiments 1 to 12.

More specifically, the invention is defined by the appended CLAIMS.

The invention claimed is:

1. A method comprising:
receiving a plurality of reference view images of an object, wherein each of the plurality of reference view images is captured from a different viewpoint; and
combining the plurality of reference view images so as to create a virtual image of the object,
wherein the virtual image is arranged at a different viewpoint from captured viewpoints of all of the plurality of reference view images,
wherein each of the plurality of reference view images is comprised of reference view pixels
wherein each of the reference view pixels is mapped to a corresponding virtual image pixel,
determining virtual transparency information for the virtual image,
wherein the virtual transparency information comprises at least components of foreground information and components of background information for each of a plurality of virtual image pixels,
wherein the components of foreground information and components of background information are derived from the corresponding pixels of the plurality of reference view images;
classifying each of the plurality of virtual image pixels based on a combination of the components of foreground information and components of background information;
selecting a third binary transparency value for each of the virtual image pixels for regions away from an edge of the object based on their classification so as to display foreground information or background information; and
setting a color value of each of the plurality of virtual image pixels, based on the foreground or background information.

2. The method of claim 1,
wherein each of the reference view pixels comprise reference transparency information,
wherein the reference transparency information comprises of foreground information, background information and components of uncertain information,
wherein the uncertain information is derived from pixels of the plurality of reference views images which are not classified as foreground information or background information.

3. The method of claim 2, further comprising, classifying the virtual image pixels as ghosting regions for each of the plurality of virtual image pixels with virtual transparency information comprising combinations of components of uncertain information and components of foreground information; and
selecting a fourth binary transparency value for each of the virtual image pixels in the ghosting regions.

4. The method of claim 2, further comprising:
selecting a first binary transparency value corresponding to non-transparent for each of the plurality of virtual image pixels with virtual transparency information comprising only components of foreground information; and
selecting a second binary transparency value corresponding to transparent for each of the plurality of virtual image pixels with virtual transparency information comprising only components of background information.

5. The method of claim 2, further comprising creating a new outer boundary of the object by selecting a first binary transparency value corresponding to transparent for virtual image pixels with virtual transparency information comprising only combinations of components of background information and components of uncertain information, or only combinations of components of uncertain information.

6. The method of claim 2, further comprising, setting the third binary transparency value of each of the pixels using the color of at least one neighboring pixel for each of the plurality of virtual image pixels with virtual transparency information comprising components of uncertain information and not comprising components of foreground information.

7. The method of claim 1, further comprising, setting the color of the pixel as the average color of the reference view image foreground components for each of the plurality of virtual image pixels with virtual transparency information comprising only components of foreground information.

8. The method of claim 1, further comprising selecting the third binary transparency value for all pixels of the virtual image.

9. The method of claim 1, further comprising, setting an intermediate transparency value between the third binary transparency values for regions at the edge of the object.

10. The method of claim 1, further comprising, determining virtual transparency information derived from the reference view images using the color of the corresponding reference view image pixels for each of the plurality of virtual image pixels.

11. The method of claim 1, wherein the background is a chroma key.

12. The method of claim 1, wherein the determining comprises:
determining a component of foreground information by comparing a binary transparency value of the corresponding pixel of the respective reference view with a first threshold.

13. A computer program stored on a non-transitory computer readable medium, wherein the computer program when executed on a processor performs the method as claimed in claim 1.

14. An image processing device, comprising:
an input circuit, wherein the input circuit is arranged to receive a plurality of reference view images of an object, wherein each of the plurality of reference view images comprises foreground information and background information captured from a different viewpoint;
a processor circuit and a memory circuit,
wherein the memory is arranged to store instructions for the processor circuit,
wherein the processor circuit is arranged to process the plurality of reference view images so as to generate a virtual image; and
an output circuit, wherein the processor circuit is arranged to output the virtual image,
wherein the processor circuit is arranged to combine the plurality of reference view images so as to create a virtual image of the object,
wherein the virtual image is arranged at a different viewpoint from captured viewpoints of all of the plurality of reference view images,
wherein each of the plurality of reference view images is comprised of reference view pixels
wherein each of the reference view pixels is mapped to a corresponding to a virtual image pixel,
wherein the processor circuit is arranged to determine virtual transparency information for the virtual image, wherein the virtual transparency information comprises at least components of foreground information and components of background information for each of a plurality of virtual image pixels, wherein the components of foreground information and components of background information are derived from the corresponding pixels of the plurality of reference view images;

wherein the processor circuit is arranged to classify each of the plurality of virtual image pixels based on a combination of the components of foreground information and components of background information;

wherein the processor circuit is arranged to select a third binary transparency value for each of the virtual image pixels for regions away from an edge of the object based on their classification so as to display foreground or background information; and wherein the processor circuit is arranged to set a color value of each of the plurality of virtual image pixels, based on the foreground or background information.

15. The image processing device of claim 14, wherein each of the reference view pixels comprise reference transparency information, wherein the reference transparency information comprises of foreground information, background information components of uncertain information, wherein the uncertain information is derived from pixels of the plurality of reference views images which are not classified as foreground information or background information.

16. Image processing device of claim 15, wherein the processor circuit is arranged to classify the virtual image pixels as ghosting regions for each of the plurality of virtual image pixels with virtual transparency information comprising combinations of components of uncertain information and components of foreground information, wherein the processor circuit is arranged to select a fourth binary transparency value for each of the virtual image pixels in the ghosting regions.

17. The image processing device of claim 15, wherein the processor circuit is arranged to select a first binary transparency value corresponding to non-transparent for each of the plurality of virtual image pixels with virtual transparency information comprising only components of foreground information, wherein the processor circuit is arranged to select a second binary transparency value corresponding to transparent for each of the plurality of virtual image pixels with virtual transparency information comprising only components of background information.

18. The image processing device of claim 15, wherein the processor circuit is arranged to create a new outer boundary of the object by selecting a first binary transparency value corresponding to transparent for virtual image pixels with virtual transparency information comprising only combinations of components of background information and uncertain information, or only combinations of components of uncertain information.

19. The method of claim 1, wherein the determining comprises determining a component of background information by comparing a binary transparency value of the corresponding pixel of the respective reference view with a second threshold.

20. The method of claim 1, wherein the determining comprises determining a component of uncertain information when a binary transparency value of the corresponding pixel of the respective reference view meets neither the first threshold nor the second threshold.

* * * * *